United States Patent [19]

Young

[11] 4,129,896
[45] Dec. 12, 1978

[54] METER RETAINER

[75] Inventor: John W. Young, Lawrenceville, Ga.

[73] Assignee: Gould Inc., Rolling Meadows, Ill.

[21] Appl. No.: 847,554

[22] Filed: Nov. 1, 1977

[51] Int. Cl.² .............................................. H02B 9/00
[52] U.S. Cl. .................................... 361/371; 361/369; 339/198 M
[58] Field of Search .................... 339/198 M; 361/364, 361/369-371

[56] References Cited
U.S. PATENT DOCUMENTS 3,382,415  5/1968  Perkins ................................. 361/369

Primary Examiner—Gerald P. Tolin
Attorney, Agent, or Firm—Ostrolenk, Faber, Gerb & Soffen

[57] ABSTRACT

A ringless-type socket for a watt hour meter is provided with support means to which an insulating carrier for plug-in contacts is mounted. The support means at its forward end is provided with seat means which limits rearward movement of a meter mounted to the socket. Also mounted on this support means are spring retainers for holding the meter in operative position on the seat means. The retainer means is deflectable so that holding means thereof is selectively releasable from holding engagement with the meter to permit removal of the latter.

11 Claims, 11 Drawing Figures

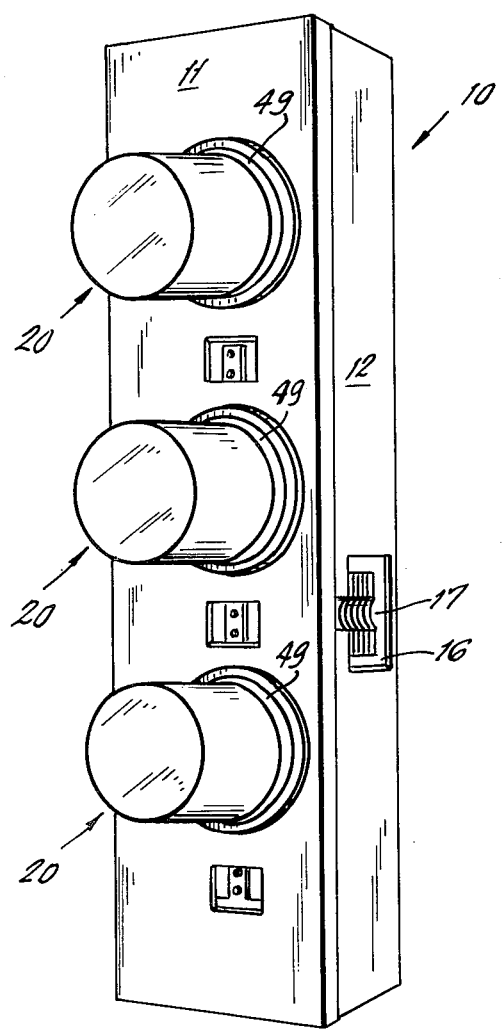
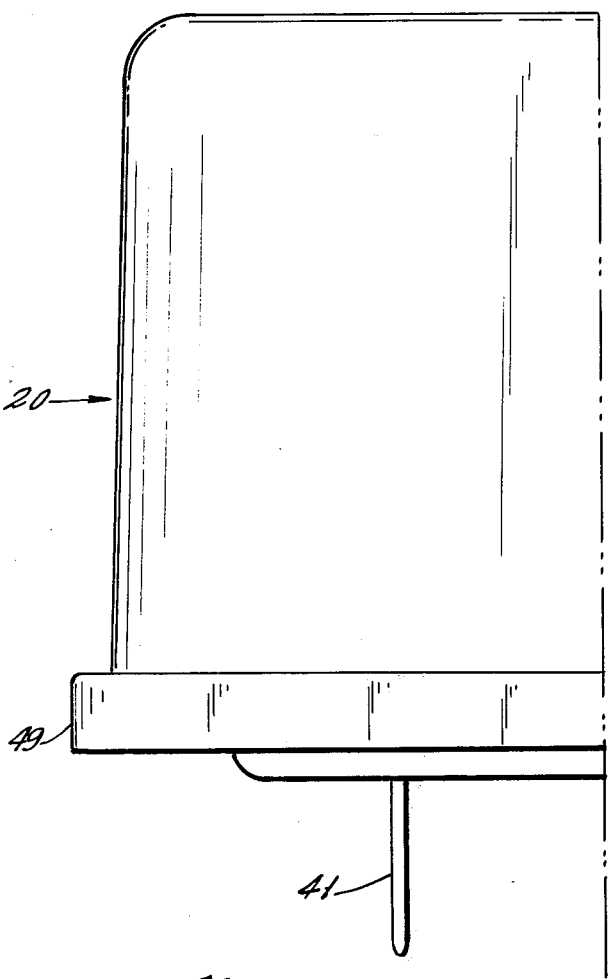
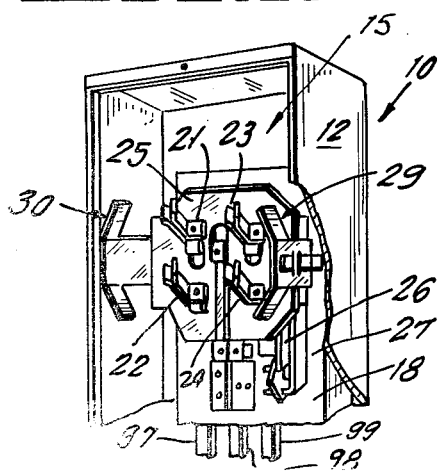
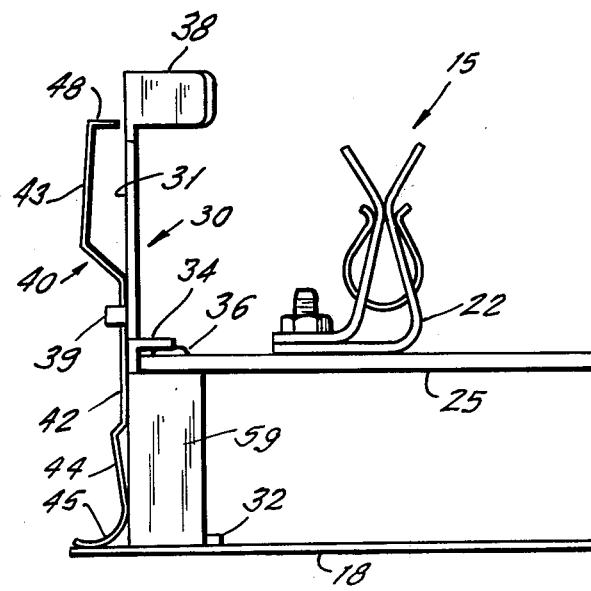

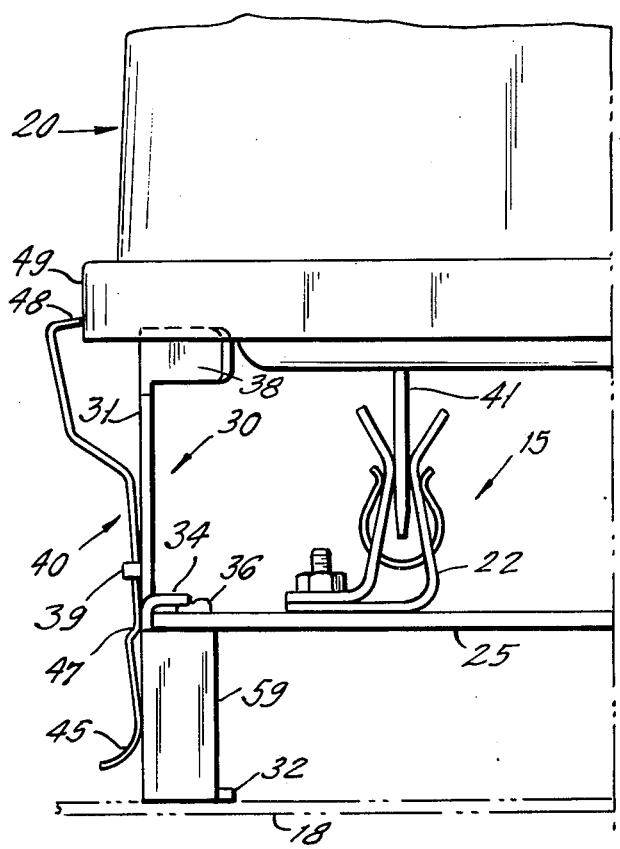
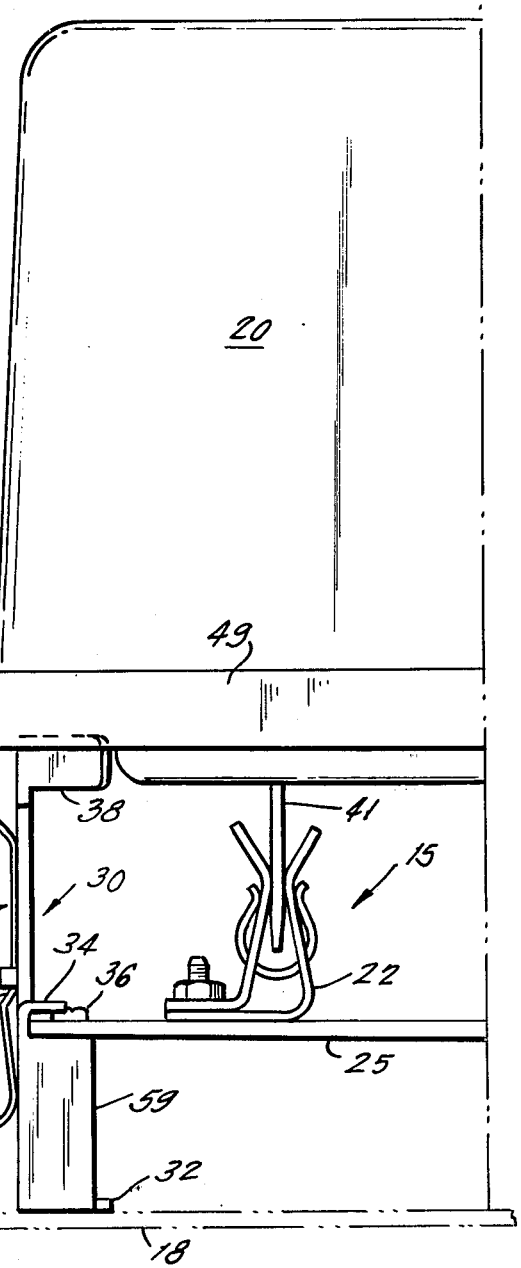

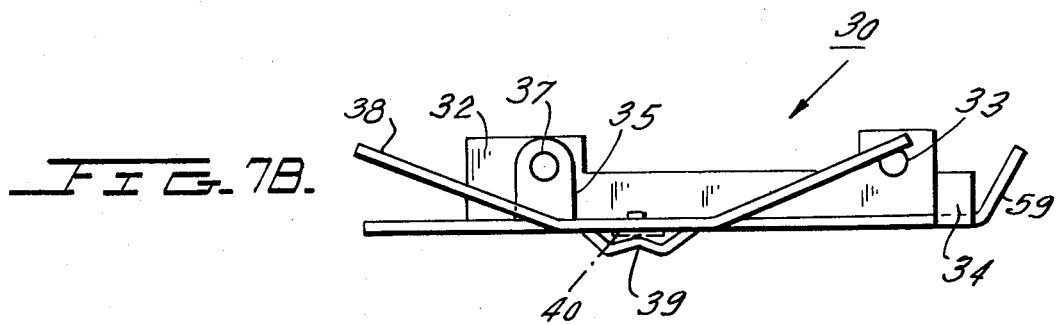
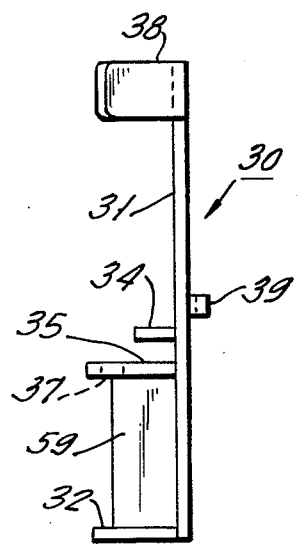
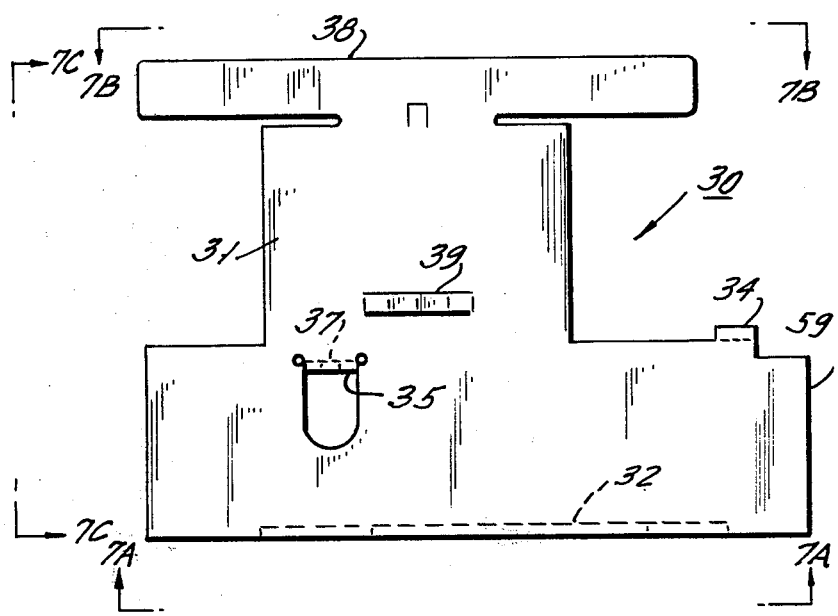
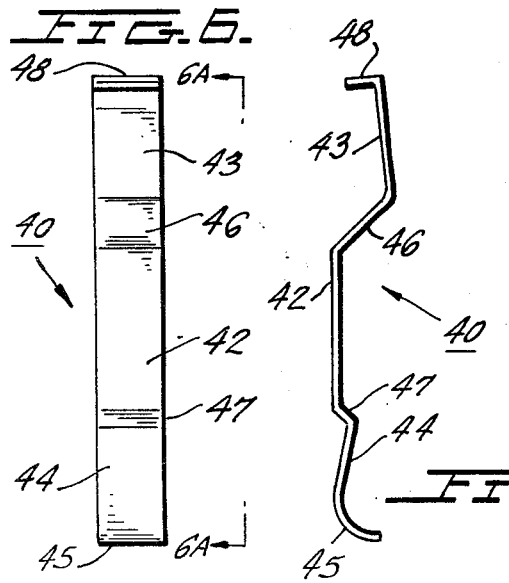

METER RETAINER

This invention relates to ringless-type sockets for watt hour meters and the like, and relates more particularly to a socket of this type that is provided with spring retainer means for holding meters against being accidentally dislodged from operative engagement with the socket.

A watt hour meter mounted to a ringless-type socket is ordinarily retained in operative engagement with the socket solely by the cover of the enclosure for the socket. Unless special means are provided, when this cover is removed the only retaining force between the meter and its socket is the frictional engagement between the plug-in contacts of the meter and socket. Under these circumstances, when the cover is removed to work inside the socket housing, a meter often becomes dislodged and falls from its socket causing unwanted interruption of electric service. This condition is especially prevalent in multiple meter panels wherein a common cover is used for a plurality of sockets. In falling from its socket the meter often breaks or causes a short circuit.

The prior art has attempted to overcome this problem by providing retainer brackets that are positionable to prevent dismounting of the meter. However, in order to reposition such brackets the loosening and tightening of screws is required. Further, such brackets often interfere with remounting of a meter.

The instant invention overcomes the difficulties of the prior art by providing spring retainers that are manually operable to and from meter holding positions. The spring retainers are slidably mounted to brackets which provide seating means for a wattmeter mounted to the socket. Mounting of the retainer means is such that it will not interfere with mounting of a meter to the socket in that the retainer means is guided for rearward movement upon engagement thereof by the meter during mounting of the latter.

Accordingly, a primary object of the instant invention is to provide a novel construction for a ringless-type socket for a watt hour meter.

Another object is to provide a socket of this type provided with novel retainer means for holding a meter against accidental removal from the socket.

Still another object is to provide a socket of this type which utilizes rearwardly slidable retainer means having outwardly deflectable holding means biased inward toward a position for holding a meter against accidental removal from the socket.

These objects as well as other objects of this invention shall become readily apparent after reading the following description of the accompanying drawings in which:

FIG. 1 is a perspective of a multiple meter panel including ringless-type sockets provided with releasable meter retainer means constructed in accordance with teachings of the instant invention.

FIG. 2 is a fragmentary perspective of the panel of FIG. 1 with its cover removed and the meters removed.

FIGS. 3, 4 and 5 are diagrams showing the retainer means when the meter is dismounted (FIG. 3), in an intermediate position during the mounting operation (FIG. 4), and completely mounted (FIG. 5).

FIG. 6 is a side elevation of a spring retainer element.

FIG. 6A is an edge view of the retainer element looking in the direction of arrows 6A—6A of FIG. 6.

FIG. 7 is a side elevation of one of the support brackets.

FIGS. 7A, 7B and 7C are additional elevations of a support bracket looking in the direction of the respective arrows 7A—7A, 7B—7B and 7C—7C, of FIG. 7.

Now referring to the Figures As will hereinafter be seen, multiple meter panel 10 is of a type shown generally in the J. S. Meacham, U.S. Pat. No. 3,530,340 issued Sept. 22, 1970, for a Multiple Meter Panel. The basic difference between panel 10 and the panel of U.S. Pat. No. 3,530,340 is that the meter sockets of the latter are provided with rings to which the meters are normally locked whereas each of the three identical sockets, indicated generally by reference numeral 15 in FIG. 2, is of the ringless-type so that cover 11 must be secured to housing 12 in the closed position of FIG. 1 in order to prevent dismounting of a watt hour meter 20 from its socket 15.

The sides of housing 12 are provided with aligned aperture 16 for access to cross busing 17 which is connected to main busing 97, 98, 99 extending lengthwise within case 12 and being enclosed by inner housing 18, as explained in detail in the aforesaid U.S. Pat. No. 3,530,340. Cover 11 is removably secured to housing 12 at the front thereof and is provided with three circular apertures 19 through which the transparent covers of wattmeters 20 extend.

Meter socket 15 includes four female-type plug-in contacts 21, 22, 23, 24 secured in operative relationship to insulating sheet contact carrier 25. Contacts 21, 22 are connected directly to the main busing and contacts 23, 24 are connected to conducting straps 26, 27, respectively, whose free ends provide plug-in stabs for circuit breaker pole units (not shown), as described in the aforesaid U.S. Pat. No. 3,530,340.

Contact carrier 25 is in a plane generally parallel to the front surface of inner housing 18 and is forward thereof. Along opposite edges thereof, carrier 25 is secured to support brackets 29, 30. Since brackets 29, 30 are of similar construction, only bracket 30 will be described in detail with particular reference to FIGS. 7 through 7C. More particularly, bracket 30 is constructed of formed sheet metal and includes main section 31 having at its rear edge inwardly turned lip 32. The latter is provided with two clearance apertures 33, 33 which receives screws (not shown) that secure bracket 30 to inner housing 18 with lip 32 resting on the front surface of housing 18. Intermediate portions of main section 31 are provided with inwardly turned ears 34, 35. Contact carrier 25 is positioned behind ear 34 and in front of ear 35, being secured to the latter by fastening means 36 which extends through clearance aperture 37 in ear 35. The side of main section 31 adjacent ear 34 is inwardly bent to form standoff 59 which also supports contact carrier 25 from the rear.

The forward edge of bracket 30 is bent to form a modified inwardly facing V constituting seating means 38 which engages wattmeter 20 (FIG. 4) to limit rearward movement thereof to a position wherein the plurality of rearwardly extending male-type plug-in contacts, only one of which 41 is shown, operatively engage socket contacts 21-24. Main section 31 is also provided with lanced and crimped guide section 39 through which retainer 40 extends.

The construction of retainer 40 is seen most clearly by particular reference to FIGS. 3, 6 and 6A. More particularly, retainer 40 is an elongated member constructed of a ribbon of spring metal formed to include central section 42 which bears against main section 31 of bracket 30, forward section 43 offset away from main section 31 and rear section 44 which, at its forward end, is offset from central section 42 away from main section 31. The rear end of section 44 is provided with curved portion 45 which frictionally engages main section 31 yet permits longitudinal movement of retainer 40.

Sections 46, 47 which connect central section 42 to the respective forward and rear sections 43, 44 provide stops which engage guide formation 39 to prevent accidental disassembly of retainer 40 and bracket 30 yet permit forward and rearward movement of retainer 40. The forward end of section 43 is bent substantially at a right angle toward main section 31 to form holding means 48.

In order to mount meter 20 to socket 15 retainer 40 is moved rearward to its position of FIG. 3 wherein holding means 48 is to the rear of seat 38. Meter 20 is then moved rearward until its contacts 41 engage contacts 21–24 of socket 15. Rearward movement of meter 20 is limited by seat 38. Forward section 43 of retainer 40 is then deflected outward or away from bracket 30 and at the same time retainer 40 is moved in a forward direction. When holding means 48 is forward of locking ring 49 of meter 20, retainer 40 is released and holding means 48 assumes the holding position in FIG. 5. In this position forward or dismounting movement of meter 20 is blocked by holding means 48, and forward movement of meter 20 is limited by the engagement of connecting section 47 with guide 39.

In order to dismount meter 20 from socket 15, retainer member 40 is deflected until holding means 48 is outboard of locking ring 49 thereby permitting meter 20 to be withdrawn from socket 15.

If holding means 48 is forward of seat 38 when meter 20 is being mounted, mounting will not be interfered with in that the rear of ring 49 will engage holding means 48 and retainer 40 will be forced rearward approximately to the position shown in FIG. 3 wherein the rear end of retainer 40 engages the forward surface of inner housing 18.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A ringless-type socket device for a watt hour meter or the like, said socket including a plurality of plug-in contacts operatively positioned at a contact region to be engaged by rearwardly extending cooperating plug-in contacts of a watt hour meter when same is mounted to said device in front of said contact region, said socket also including support means having at its forward end seat means operatively positioned to be engaged by a watt hour meter when same is mounted to said device to limit rearward movement of the latter, spring retainer means mounted on said support means and having at its forward end holding means operable to a holding position forward of said seat means to block forward movement of a watt hour when same is mounted to said device, said retainer means being deflectable for outward movement of said holding means to a releasing position thereby permitting a watt hour meter when same is mounted to said device to be dismounted therefrom.

2. A ringless-type socket device as set forth in claim 1 in which the retainer means is bodily movable relative to said support means between a front and a rear position, said retainer means being in said front position when said holding means is in said holding position, with said retainer means in said rear position said holding portion being in an inactive position withdrawn from interference with either mounting or dismounting of a watt hour meter to said device.

3. A ringless-type socket device as set forth in claim 2 in which the holding means when in said mounting position is no more forward that said seat means.

4. A ringless-type socket device as set forth in claim 2 in which the support means includes an integral formation providing means for guiding sliding movement of said retainer means between said front and rear positions.

5. A ringless-type socket device as set forth in claim 4 in which the integral formation also mounts said retainer means on said support means.

6. A ringless-type socket device as set forth in claim 2 in which the retainer means includes a formed elongated strip of thin sheet metal and is positioned with the longitudinal axis of the strip extending generally from front to rear.

7. A ringless-type socket device as set forth in claim 6 in which the holding means extends inwardly toward the contact region, said strip at the rear thereof including a curved section which bears against the support means.

8. A ringless-type socket device as set forth in claim 7 in which the portion of said strip immediately to the rear of the holding means is offset from the support means in a direction away from the contact region.

9. A ringless-type socket device as set forth in claim 6 in which the support means includes an integral formation providing means for guiding sliding movement of said retainer means between said front and rear positions, said integral formation also mounting said retainer means on said support means.

10. A ringless-type socket device as set forth in claim 9 also including an insulating carrier to which the contacts of the device are mounted, said carrier being secured to said support means.

11. A ringless-type socket device as set forth in claim 1 also including an insulating carrier to which the contacts of the device are mounted, said carrier being secured to said support means, said support means including first and second sections disposed along opposite edge portions of said carrier, said retainer means including elongated first and second sections mounted to the respective first and second sections of said support means, said holding means including first and second holding sections at the forward ends of the respective first and second sections of the retainer means, said holding sections projecting toward one another.

* * * * *